C. OTTINGER.
Improvement in Car-Couplings
No. 128,900.   Patented July 9, 1872
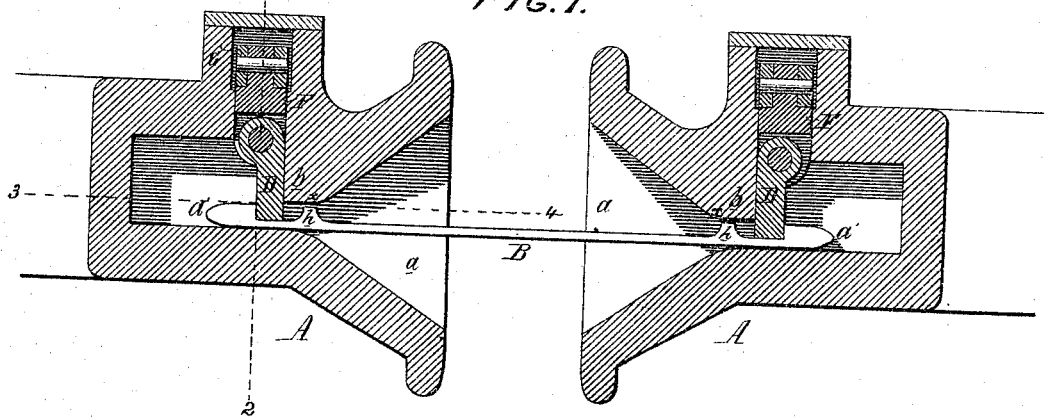
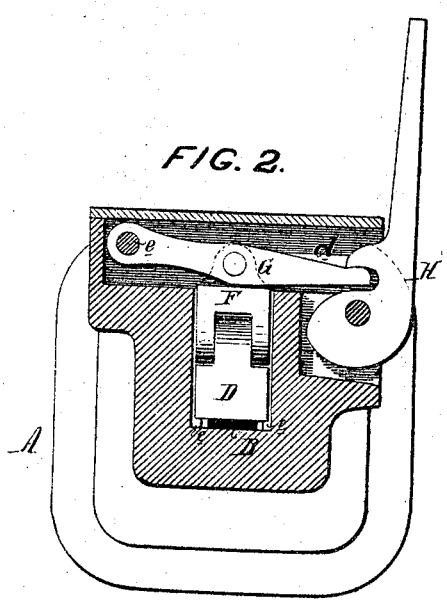
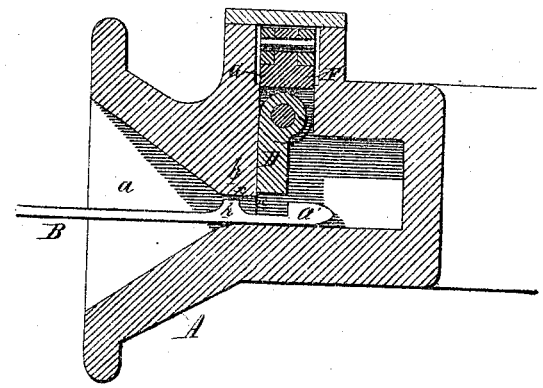
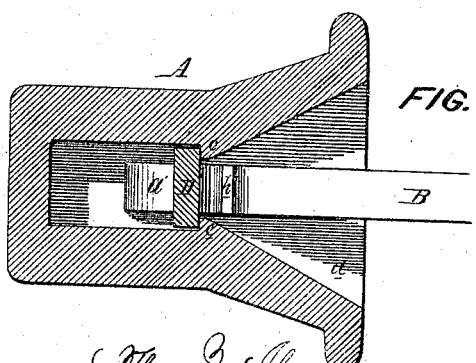
WITNESSES  Thomas McIlvain
Harry Smith
Charles Ottinger
by his Attr.
Howson and Son.

UNITED STATES PATENT OFFICE.

CHARLES OTTINGER, OF PHILADELPHIA, PENNSYLVANIA.

IMPROVEMENT IN CAR-COUPLINGS.

Specification forming part of Letters Patent No. 128,900, dated July 9, 1872.

Specification describing Improvements in Car-Couplings, invented by CHARLES OTTINGER, of the city and county of Philadelphia and State of Pennsylvania.

*Improvements in Car-Couplings.*

My invention consists of certain improvements—too fully explained hereafter to need preliminary description—in automatic car-couplings, the said improvements having been designed especially with the view of attaining simplicity and strength.

In the accompanying drawing, Figure 1 is a sectional view of my improved car-coupling, showing the coupling completed; Fig. 2, a transverse section of one of the draw-heads on the line 1 2, Fig. 1; Fig. 3, a sectional plan on the line 3 4, Fig. 1; and Fig. 4, a view of part of Fig. 1, showing the position of the several parts when in the act of uncoupling.

A represents the draw-head of one car, with its usual flaring-mouth $a$; and A′, the draw-head of an adjoining car, to be coupled to the first. Instead of the usual link I employ a coupling-bar, B, having at each of its opposite ends a hooked enlargement, $a'$, which, when inserted into the draw-head, pushes back and elevates the lower end of a hinged coupling pin or plate, D, which drops to a position in front of the hooked end of, and thus retains, the said bar when the latter has been inserted to the proper extent. (See Fig. 1.) The coupling pin or plate D retains the bar firmly, and without risk of yielding to the strains to which it is subjected, as it is sustained not only in front by the portion $b$ of the draw-head, (Fig. 1,) but at the sides by shoulders $c$ $c$ of the latter, as shown in Fig. 3. The plate D is hinged to a link, F, which is pivoted to an arm, G, contained within a transverse recess, $d$, at the top of the draw head, and hung to a pin, $e$, at one end of the same. At its outer end the said arm is acted on by a cam-lever, H, hung to the side of the draw-head. This cam-lever is of such peculiar shape that when turned to one of its extreme positions, as shown in Fig. 2, it shall depress the arm G, link F, and coupling-plate, and thus lock and retain the same; and so that, when turned downward to its other extreme position, it shall correspondingly elevate and hold up the said parts, including the coupling-plate D, as shown in Fig. 4. This latter movement will release and permit the withdrawal of the coupling-bar B, or permit the latter to be inserted into, and withdrawn from, the draw-head without coupling, as in backing, &c. A projection, $h$, at each end of the coupling-bar, adjacent to its hooks $a'$, strikes against the portion $x$ of the draw-head, and thus insures the instant release of the said coupling-bar, when the plate D is raised, by preventing it from being lifted by and with the latter. By substituting a hinged pin, controlled by a cam-lever in the manner above described, for the plate D an ordinary link could be used in place of the hooked bar B, but I prefer to employ the latter.

The arm G might, in some cases, be dispensed with, and the cam-lever be caused to act directly upon a horizontal projection of the link F; but the latter, in such case, would have to be accurately held and guided in its recess in the draw head.

I claim as my invention—

1. A hinged coupling pin or plate D, controlled and operated by a cam-lever, H, substantially in the manner described, and through the medium of the devices described, or their equivalents.

2. The hooked coupling-bar B, and its projection $h$, in combination with the hinged and vertically adjustable coupling-plate D.

In testimony whereof I have signed my name to this specification in the presence of two subscribing witnesses.

CHARLES OTTINGER.

Witnesses:
WM. A. STEEL,
JOHN K. RUPERTUS.